(12) United States Patent
Davidson

(10) Patent No.: US 6,317,541 B1
(45) Date of Patent: *Nov. 13, 2001

(54) LOW THERMAL SKEW FIBER OPTIC CABLE

(75) Inventor: Howard L. Davidson, San Carlos, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/479,673

(22) Filed: Jan. 7, 2000

Related U.S. Application Data

(63) Continuation of application No. 09/006,101, filed on Jan. 13, 1998, now Pat. No. 6,028,975.

(51) Int. Cl.$^7$ .................................................. G02B 6/44
(52) U.S. Cl. ..................... 385/102; 385/112; 385/101; 385/114
(58) Field of Search ............................ 385/100–114, 102

(56) References Cited

U.S. PATENT DOCUMENTS

| | | | |
|---|---|---|---|
| 4,304,462 | 12/1981 | Baba et al. ........................ | 350/96.23 |
| 4,514,036 | * 4/1985 | McDonald ......................... | 385/100 X |
| 4,547,626 | 10/1985 | Pederson et al. ................... | 174/107 |
| 5,268,971 | * 12/1993 | Nilsson et al. ..................... | 385/101 |
| 5,703,984 | * 12/1997 | Carratt et al. ..................... | 385/106 |
| 5,838,862 | * 11/1998 | Chien ................................. | 385/102 |
| 6,028,975 | * 2/2000 | Davidson ........................... | 385/102 |

FOREIGN PATENT DOCUMENTS 0 345 452   4/1989   (EP) .

OTHER PUBLICATIONS

Patent Abstracts of Japan, publication No. 02126208, published May 15, 1990.
Patent Abstracts of Japan, publication No. 04357427, published Dec. 10, 1992.

* cited by examiner

Primary Examiner—Phan T. H. Palmer
(74) Attorney, Agent, or Firm—Conley, Rose & Tayon, PC; B. Noel Kivlin

(57) ABSTRACT

A fiber optic cable is provided with a thermal shield which consists (proceeding outward from the cable) of a temperature insulating layer of a foam plastic such as polyethylene, a plastic film wrap such as aluminized nylon, a metallic braid such as tinned copper and an outer jacket of plastic as additional temperature insulation and to facilitate pulling the cable. The film wrap and outer jacket are optional. For further shielding a second layer of foam plastic may be positioned outside the first metallic braid followed by a second plastic film wrap, a second metallic braid and an outer plastic jacket. If the shielded cable is near a source of heat, such as a hot water pipe or an air conditioning duct, the fiber optic cable temperature is uniform throughout its cross-section. Without the thermal shield instability of the signals in different fibers may occur because of heat differential.

27 Claims, 1 Drawing Sheet

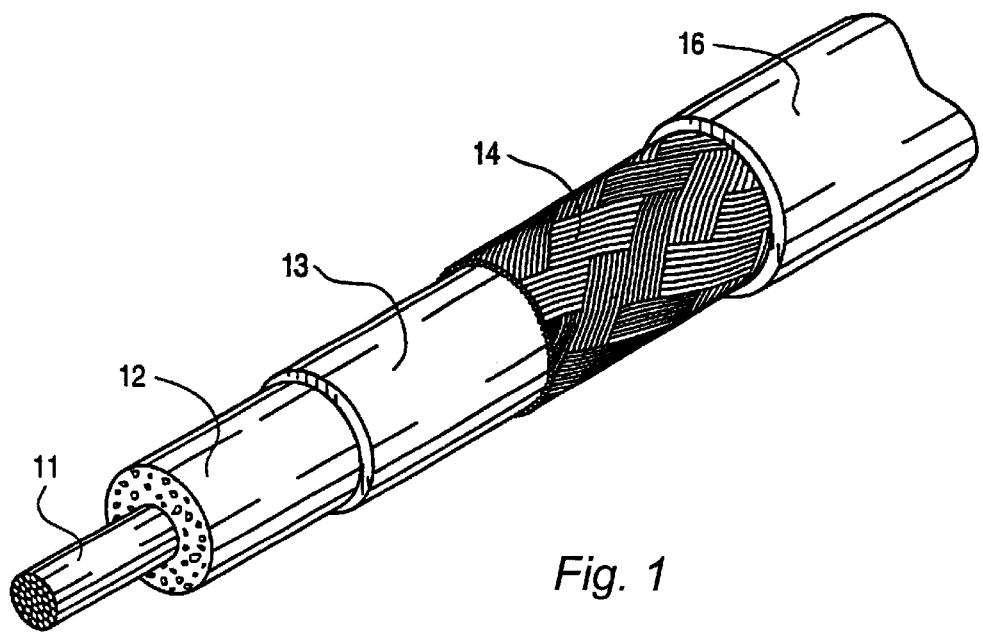
Fig. 1
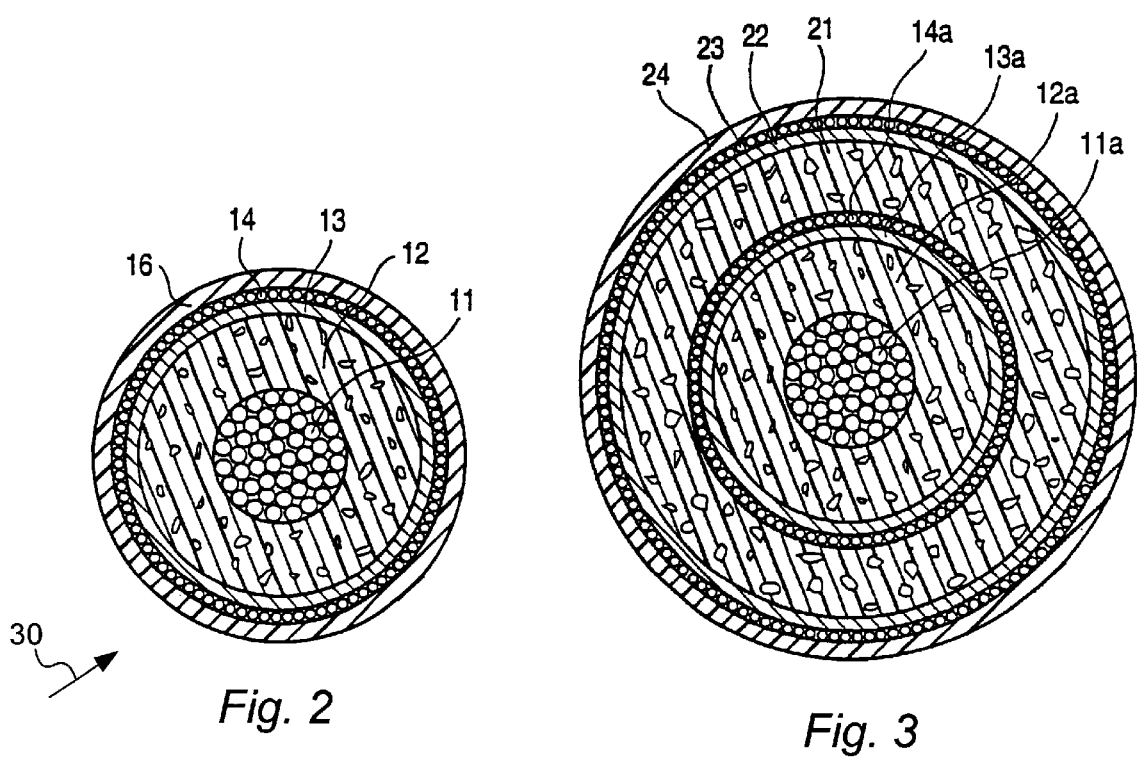
Fig. 2
Fig. 3

LOW THERMAL SKEW FIBER OPTIC CABLE

This application is a continuation of U.S. patent application Ser. No. 09/006,101, entitled "Low Thermal Skew Fiber Optic Cable", filed Jan. 13, 1998 now U.S. Pat. No. 6,028,975.

BACKGROUND OF INVENTION

1. Field of the Invention

This invention relates to a new and improved low thermal skew optic cable covered with successive layers of materials in such manner that heat or cold from a localized source is distributed relatively uniformly throughout the fiber optic cable.

2. Description of Related Art

The use of fiber optic cables as carriers for electronic signals is well known Frequently such fiber optic cables are coated with a plastic jacket which not only provides thermal insulation but functions as a slick surface to make it easier to pull a cable through a conduits, etc. The use of metallic braid and the use of a metallized polymer film under the braid are likewise well known in industry, for example, in coaxial cables.

SUMMARY OF THE INVENTION

Fiber optic cables may comprise several fibers either as filaments or ribbons within a single cable. One of the fibers may provide a clock signal used to recover data at the receiving end. Frequently, such cables are positioned in proximity to a source of heat or cold such as a hot water pipe or air conditioning duct, whereupon one of the fibers or ribbons is at a different temperature than another located farther from the source of heat or cold. This results in different travel times of data over the different fibers, a phenomenon known as "thermal skew". The present invention reduces thermal skew.

Temperature gradients which may result in differential delay times through different fibers in a multi-fiber cable may be a performance limiter because of temperature differentials between fibers on opposite sides when the cable is positioned so that one side is close to a source of heat or cold. A principal object of the present invention is to reduce temperature gradients in such structures. Temperature gradients may result in change in length of the fibers and also a change in the index of refraction.

In accordance with this invention, a thermal shield is formed around the core of the cable. In one preferred form of the invention a layer of foam plastic surrounds the fiber optic core or bundle. A metallic braid such as tinned copper surrounds the foam plastic. To block radiative heat transfer through gaps in the braid, a layer of metallized plastic film may be positioned underneath the braid. As further heat insulation and also to make the cables slick, a plastic jacket may be placed over the metallic braid.

In a modified form of the invention a second layer of foam plastic is positioned around the aforementioned metallic braid and the second layer of foam plastic is covered with a second metallized plastic film with a second metallic braid around the outside of the film. Again, a plastic jacket may go over the second or outer metallic braid.

In addition to enhancing radiant reduction, the use of two metallic braids also makes it possible to use one braid for power and the other for return to operate electronics at the far end of the cable.

Still another feature of the invention is that the use of metallic braids increases the tensile strength of the cable and thus may eliminate the need for Kevlar strength members which are often incorporated into fiber optic cables in order to pull the cable.

BRIEF DESCRIPTION OF THE DRAWING

The accompanying drawings, which are incorporated in and form a part of this specification, illustrate embodiments of the invention and, together with the description serve to explain principles of the invention.

FIG. 1 is a perspective view of a cable in accordance with the present invention with successive layers cut away to reveal internal construction.

FIG. 2 is a transverse cross-section of the structure of FIG. 1.

FIG. 3 is a view similar to FIG. 2 of a modification.

DESCRIPTION OF THE PREFERRED EMBODIMENT

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

A core consisting of a fiber optic bundle 11 is well known in the electronics industry. The core is composed of plural discrete filaments or ribbons (herein "fiber optic elements") each of which is adapted to carry an optical signal. For example, one such element may carry a timing signal. The signals transmitted on such bundles are extremely sensitive to time delays such as those caused by one of the elements being heated to a higher temperature than another on the opposite side of the cable. Hence, due to temperature differentials, the signals may be "skewed".

In accordance with the present invention a buffer layer 12 of plastic foam surrounds the core 11 and provides mechanical thermal insulation. There are a number of suitable foam plastics of which typical materials are foamed polyethylene, polytetrafluoroethylene such as foamed TEFLON and foamed polypropylene. Suitable foam plastics are such as are used as the dielectric of coaxial cables. Suitable cables are Belden 924-8 (cellular polyethylene) or Belden 89880 (foamed TEFLON®, both products of Belden Wire & Cable Co.). Other dielectrics may also be used. Suitable dielectrics have low thermal conductivity and are light and flexible.

A metallic braid 14 is positioned around the outside of the buffer layer. Such a braid may be of tinned copper such as that used to shield flexible coaxial cables. Bare copper and silver-plated copper are also suitable. A served wrap of wire or metal foil are also suitable. An advantage of the metallic braid is that is gives tensile strength to the cable and makes it possible to eliminate the conventional Kevlar strength member which is frequently incorporated into fiber optic cables.

To reduce the possibility of radiative heat transfer through the small gaps in the braid 14, it is desirable to place a layer of metallized polymer film 13 between the plastic foam layer 12 and the braid 14. Aluminized polyester tape is suitable for such purpose.

An outer jacket 16 is placed over the braid. Such a jacket may be formed of vinyl polyurethane, polytetrafluoroethylene such as TEFLON®, natural or synthetic rubber and other products. The outer plastic jacket 16 provides additional heat insulation but more importantly as is well known in the fiber optic cable industry, it provides an abrasion resistant outer surface which facilitates pulling the cable through conduits around corners and in other installations.

A source of heat or cold 30 is indicated by the arrow in FIG. 2. This may be a hot water pipe, a very cold pipe or air conditioning duct, or the like. Direct thermal conduction of the heat or cold to the fiber optic cable 11 is isolated by the foam plastic layer 12. The metallic braid 14, being heat conductive, distributes the heat around the circumference of the foam plastic insulation layer 12. Hence, thermal skew of the fibers in the cable bundle 11 is greatly reduced.

As illustrated in FIG. 3, additional temperature gradient reduction can be obtained by applying a second plastic foam layer 21 around the metallic braid 14, a second (optional) metallized pod film 22 around the layer 21 and under second metallic braid 23. An outer jacket 24 similar to the jacket 16 may surround the braid 23.

In other respect, the modification of FIG. 3 resembles the preceding modification and the same reference numerals, followed by the subscript "a", are used to designate corresponding parts.

Using two shields with film radiation barriers provides two stages of radiant reduction. A second advantage of the use of two metallic braids 14, 23 is to provide power and return to operate electronics at the far end of the cable.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

It is intended that the scope of the invention be defined by the claims appended hereto and their equivalents.

What is claimed is:

1. A cable comprising a core including a bundle of elements, a layer of thermal insulation around the core, a layer of heat-conductive material around the thermal insulation, and a blocking layer positioned between the thermal insulation and the heat-conductive material.

2. The cable according to claim 1 in which said thermal insulation is foam plastic.

3. The cable according to claim 1 wherein said thermal insulation is foamed polyethylene, foamed polypropylene, or foamed polytetrafluoroethylene.

4. The cable according to claim 1 wherein said heat-conductive material is metallic braid, served wrap of wire or metal foil.

5. The cable according to claim 4 in which said braid is tinned copper, bare copper, or silver-plated copper.

6. The cable according to claim 1 in which said blocking layer is metallized plastic film.

7. The cable according to claim 1 in which said blocking layer is aluminized polyester.

8. The cable according to claim 1 which further comprises a jacket around said heat-conductive material.

9. The cable according to claim 1 wherein the elements are fiber optic fibers.

10. A cable comprising:
    a core including information carriers;
    a first thermal insulation layer around the core;
    a first heat-conductive material layer around the first thermal insulation layer;
    a second thermal insulation layer around the first heat-conductive material layer; and
    a second heat-conductive material layer around the second thermal insulation layer.

11. cable of claim 10, further comprising a metallized film between the first thermal insulation layer and the first heat-conductive material layer.

12. The cable of claim 10, further comprising a metallized film between the second thermal insulation layer and the second heat-conductive material layer.

13. cable of claim 10, wherein the first thermal insulation layer comprises a foamed polymer.

14. The cable of claim 10, wherein the second thermal insulation layer comprises a foamed polymer.

15. cable of claim 10, wherein the first heat conductive material is metallic braid, served wrap of wire, or metal foil.

16. The cable of claim 10, wherein the second heat-conductive material is metallic braid, served wrap of wire, or metal foil.

17. The cable of claim 10, further comprising a jacket surrounding the second heat-conductive material.

18. The cable of claim 10, wherein the first heat-conductive material is an electrical conductor configured to convey electricity through the cable, wherein the second heat-conductive material is an electrical conductor configured to convey electricity through the cable, and wherein the second thermal insulation layer is a dielectric material.

19. The cable of claim 10, wherein the information carriers comprise fiber optic fibers.

20. A cable system comprising:
    a cable having:
        a core comprising information carriers;
        a thermal insulation layer around the core;
        a blocking layer around the thermal insulation layer;
        a high thermal conductivity material around the metallized film; and
    a thermal source adjacent to a portion of the cable, the thermal source at a different temperature than a temperature of the core;
    wherein the heat-conductive material dissipates heat transferred to or from the thermal source over a large area, wherein the metallized film inhibits radiant heat transfer to the thermal insulation layer, and wherein the thermal insulation layer inhibits heat transfer to or from the core.

21. cable system of claim 20, wherein the information carriers comprise fiber optic elements.

22. cable system of claim 20, wherein the thermal insulation layer comprises a foamed polymeric material.

23. cable system of claim 20, wherein the blocking layer comprises a metallized polymer.

24. cable system of claim 20, wherein the high thermal conductivity material comprises metallic braid.

25. The cable system of claim 20, wherein the thermal source is at a greater temperature than the core.

26. The cable system of claim 20, wherein the thermal source is at a lower temperature than the core.

27. The cable system of claim 20, wherein the thermal insulation layer comprises a foamed polymeric material, wherein the blocking layer comprises a metallized polymer, and wherein the high thermal conductivity material comprises metallic braid.

* * * * *

UNITED STATES PATENT AND TRADEMARK OFFICE
CERTIFICATE OF CORRECTION

PATENT NO.    : 6,317,541 B1
DATED         : November 13, 2001
INVENTOR(S)   : Howard L. Davidson It is certified that error appears in the above-identified patent and that said Letters Patent is hereby corrected as shown below:

Column 4,
Lines 7, 12 and 16, please insert -- The -- before cable.
Lines 45, 47 and 49, please insert -- The -- before cable.
Line 51, please insert -- The -- before cable.

Signed and Sealed this

Thirteenth Day of August, 2002

Attest:

JAMES E. ROGAN
Attesting Officer    Director of the United States Patent and Trademark Office